US006526386B1

(12) United States Patent
Chapman et al.

(10) Patent No.: US 6,526,386 B1
(45) Date of Patent: Feb. 25, 2003

(54) SYSTEM AND METHOD FOR AUTOMATICALLY GENERATING AUTOMOBILE INSURANCE CERTIFICATES FROM A REMOTE COMPUTER TERMINAL

(75) Inventors: Ellen Chapman, Sicklerville, NJ (US); Patrick Chu, Voorhees, NJ (US); Lloyd M. Dean, Florence, NJ (US); Kathy L. Isherwood, Laurel Springs, NJ (US)

(73) Assignee: Ace Limited, Philadelphia, PA (US)

( * ) Notice: Subject to any disclaimer, the term of this patent is extended or adjusted under 35 U.S.C. 154(b) by 0 days.

(21) Appl. No.: 09/329,660

(22) Filed: Jun. 10, 1999

(51) Int. Cl.[7] ............................................... G06F 17/60
(52) U.S. Cl. ................................................. 705/4; 705/2
(58) Field of Search .................................... 705/4, 2, 3

(56) References Cited

U.S. PATENT DOCUMENTS 4,831,526 A * 5/1989 Luchs et al. .................... 705/4
5,459,304 A * 10/1995 Eisenmann ................. 235/380

OTHER PUBLICATIONS

Waterhouse, Stephen T. "Online Agencies Enjoy Competitive Advantages." National Underwriter. Oct. 21, 1996. pp. 12, 26.*

Eyler, Todd. "Personal Lines Online: Insurance Over the Internet." Bank Marketing. Apr. 1998. pp. 49–53.*

* cited by examiner

Primary Examiner—Sam Rimell
(74) Attorney, Agent, or Firm—ReedSmith LLP; Thomas J. McWilliams

(57) ABSTRACT

A system and method for generating automobile insurance certificates from a remote computer terminal connected by a computer network to a central computer, wherein an expiring automobile insurance policy is identified by viewing on the remote computer terminal data, stored on the central computer, relating to expiring policies and an automobile insurance certificate relating to the expiring policy is ordered electronically, in response to such identification, from the remote computer terminal.

5 Claims, 10 Drawing Sheets

500

Select a Policy

Your search returned 768 policies

| Policy Number | Insured Name | Effective Date | Expiration Date | Carrier Status | FH Status |
|---|---|---|---|---|---|
| CAL388837 | John Insured | 01/01/1999 | 02/28/1998 | EX | |
| CAL452228 | Jane Insured | 11/01/1997 | 02/28/1998 | EX | |
| CAL452228 | Jane Insured | 02/28/1998 | 02/28/1998 | AC | FH4 |
| CAL452229 | George Conrad | 11/01/1997 | 02/28/1998 | EX | |
| CAL452229 | George Conrad | 02/28/1998 | 02/28/1998 | AC | |
| CAL452230 | Tony Driver | 11/01/1997 | 02/28/1998 | EX | |
| CAL452230 | Tina Driver | 02/28/1998 | 02/28/1998 | AC | |

Click any column on the policy you wish to work on       [Cancel]

| Black Car |
|---|
| File  Options  Help |

Policy H91111111 effective 2/28/2001

602
- Policy Number: H91111111
- Product Code: N80507
- Policy Source: Office Entry
- Effective Date: 2/28/2001
- Company Name: Carrier Insurance Company
- Carrier Status: Unknown
- Expiration date: 2/28/2002
- FH Status: FH 1
- Policy History 604
Insured Name and Address
- Name: John Insured
- Address: 1 One Liberty Place
- Address: 2
- City: Philadelphia   State: PA   Zip: 19103

606
Empolyment Information (optional)
- Soc. Sec. / Fed. Emp. No.
- ○ U.S.A. Social Security No.
- ○ Federal Employment Number
- ○ Canadian Social Security No.

608
Vehicle Information
- Year: 1994
- Make: LINCOLN
- Model: TOWNCAR
- VIN/ Serial No.: 12345
- Seating Capacity: 5

Transaction Information
- Type: ⦿ FH 1  ○ FH 4
- Reason: To Remain
- Effective Date: 04/02/2001

610   612   [Print FH]  [Cancel]

FH--1 (8/67) State of New York - Department of Motor Vehicles
INSURANCE CERTIFICATE - FOR HIRE PASSENGER VEHICLE
☐ 400 Carrier Fire Underwriters Insurance Company
☒ 487 Carrier Insurance Company
☐ 004 Carrier Property and Casualty       6 1 1 1 an authorized New York Insurer, certifies that it has issued a policy complying
with Section 370 of the Vehicle and Traffic Law to:

John Insured
One Liberty Place
Philadelphia, PA 19103 applicable with respect to the following Motor Vehicle:

| Year | Make of Vehicle | Identification or Serial No. | Seating Capacity |
|------|-----------------|------------------------------|------------------|
| 2001 | PONTIAC | 9376H784393F778S | 5 | not applicable on and after date of this certificate to the following replaced vehicle:

| Year | Make of Vehicle | Identification or Serial No. | Seating Capacity |
|------|-----------------|------------------------------|------------------|
|      |                 |                              |                  |

(See instructions on Reverse Side)

SOCIAL SECURITY OR
FEDERAL EMPLOYER'S NO.

| Individual | Federal | Canadian |
|------------|---------|----------|
| ☐ U.S.A. Soc. Sec. No. | ☐ Employer's Number | ☐ Soc. Sec. No. Number |

Explanation:        To Register

POLICY
NUMBER        H9  00  32 - 71  2

EFFECTIVE _____
From Midnight 2/28/2001    To Midnight.    Feb. 28, 2002
(not applicable to obtain registration plates after 60 days from effective date)
—— Name and Address os Agency or Office Issuing FH-4 ——

Insurance Agency
1735 Market St
Philadelphia, PA 19103    Agent

Signature of Authorized Representative

---

FH--1 (8/67) State of New York - Department of Motor Vehicles
INSURANCE CERTIFICATE - FOR HIRE PASSENGER VEHICLE
☐ 400 Carrier Fire Underwriters Insurance Company
☒ 487 Carrier Insurance Company
☐ 004 Carrier Property and Casualty       6 1 1 1 an authorized New York Insurer, certifies that it has issued a policy complying
with Section 370 of the Vehicle and Traffic Law to:

John Insured
One Liberty Place
Philadelphia, PA 19103 applicable with respect to the following Motor Vehicle:

| Year | Make of Vehicle | Identification or Serial No. | Seating Capacity |
|------|-----------------|------------------------------|------------------|
| 2001 | PONTIAC | 9376H784393F778S | 5 | not applicable on and after date of this certificate to the following replaced vehicle:

| Year | Make of Vehicle | Identification or Serial No. | Seating Capacity |
|------|-----------------|------------------------------|------------------|
|      |                 |                              |                  |

(See instructions on Reverse Side)

SOCIAL SECURITY OR
FEDERAL EMPLOYER'S NO.

| Individual | Federal | Canadian |
|------------|---------|----------|
| ☐ U.S.A. Soc. Sec. No. | ☐ Employer's Number | ☐ Soc. Sec. No. Number |

Explanation:        To Register

POLICY
NUMBER        H9  00  32 - 71  2

EFFECTIVE _____
From Midnight 2/28/2001    To Midnight.    Feb. 28, 2002
(not applicable to obtain registration plates after 60 days from effective date)
—— Name and Address os Agency or Office Issuing FH-4 ——

Insurance Agency
1735 Market St
Philadelphia, PA 19103    Agent

Signature of Authorized Representative

---

FH--1 (8/67) State of New York - Department of Motor Vehicles
INSURANCE CERTIFICATE - FOR HIRE PASSENGER VEHICLE
☐ 400 Carrier Fire Underwriters Insurance Company
☒ 487 Carrier Insurance Company
☐ 004 Carrier Property and Casualty       6 1 1 1

(See instructions on Reverse Side)

SOCIAL SECURITY OR
FEDERAL EMPLOYER'S NO.

| Individual | Federal | Canadian |
|------------|---------|----------|
| ☐ U.S.A. Soc. Sec. No. | ☐ Employer's Number | ☐ Soc. Sec. No. Number |

FIG. 10

SYSTEM AND METHOD FOR AUTOMATICALLY GENERATING AUTOMOBILE INSURANCE CERTIFICATES FROM A REMOTE COMPUTER TERMINAL

FIELD OF THE INVENTION

The present invention relates generally to automobile insurance and more particularly to generating automobile insurance certificates from a remote computer terminal. Still more particularly, the present invention relates to generating automobile insurance certificates covering for hire automobiles from a remote computer terminal.

BACKGROUND

A significant problem affecting the insurance industry with regard to policies of insurance covering for hire vehicles is correctly issuing forms required by state law that are necessary for writing the policies. In certain states, such as New York, stringent requirements exist as to the timing of the issuance of certain forms, such as FH1 and FH4 forms. Complying with these requirements is very burdensome using conventional methods. If the requisite forms could be generated by an insurance agent without the need for significant interaction with personnel at an insurance carrier, substantial time and cost savings could be realized.

From the point of view of the insured, it would also be desirable to shift as much of the responsibility as is possible for handling the generation of such forms required by state or local law from the carrier to the agent. While the agent typically has a personal relationship with the insured and can work with the insured to meet the insured's needs, the nature of an insurance carrier renders such a personal relationship with the insured difficult for it to achieve.

It is therefore a further object of the present invention to allow an insurance agent to generate automobile insurance certificates with a minimum of interaction with insurance carrier personnel.

SUMMARY OF INVENTION

The present invention is directed to a system and method for generating automobile insurance certificates from a remote computer terminal connected by a computer network to a central computer. The remote user identifies an expiring automobile insurance policy by viewing on the remote computer terminal data, stored on the central computer, relating to expiring policies. The user then orders electronically, in response to such identification, an automobile insurance certificate from the remote computer terminal.

BRIEF DESCRIPTION OF THE DRAWINGS

FIG. 5 illustrates a graphical user interface used to aid an insurance agent in retrieving data relating to expiring automobile insurance policies in accordance with a first preferred embodiment of the present invention.

FIG. 6 illustrates a graphical user interface used to aid an insurance agent in editing data relating to expiring automobile insurance policies in accordance with a first preferred embodiment of the present invention.

FIG. 9 illustrates a sample automobile insurance cancellation notice in accordance with a first preferred embodiment of the present invention.

FIG. 10 illustrates a sample automobile insurance renewal policy in accordance with a first preferred embodiment of the present invention.

DETAILED DESCRIPTION OF THE INVENTION

Figure 1:
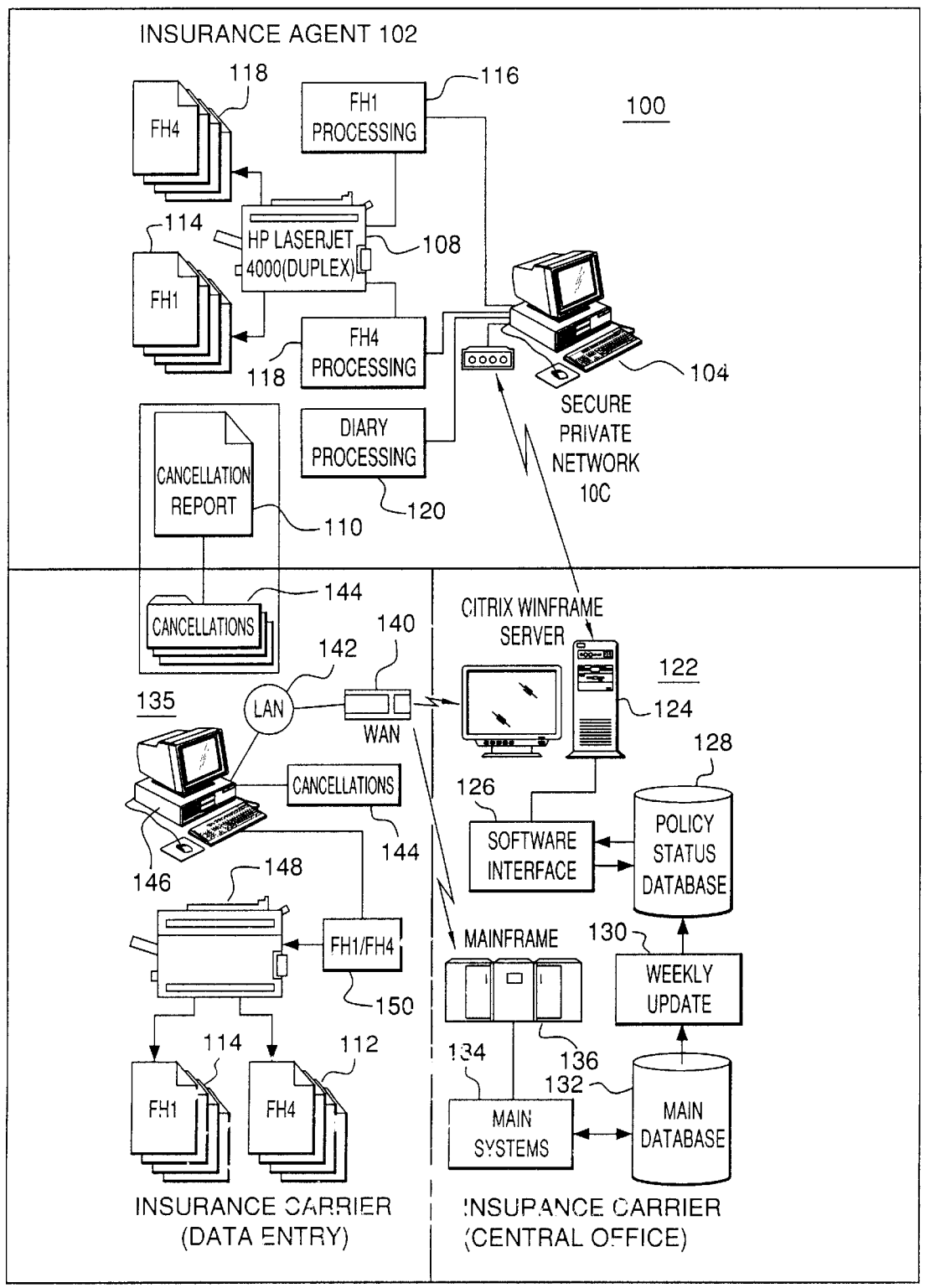
FIG. 1 is a block diagram in accordance with a first preferred embodiment of the present invention.

The following definitions are provided to aid in understanding the claims of the present application:

Automobile Insurance Certificate. A document that constitutes evidence of insurance (or lack of insurance) of one or more for hire vehicles in accordance with federal, state, local, foreign, or international law and that complies with all formal requirements imposed by applicable law. The term automobile insurance certificate encompasses, but is not limited to, FH1 and FH4 forms in use in the state of New York at the time of the filing of the present application and other forms now or hereafter used for similar purposes in New York and other states.

Black car. A for hire passenger vehicle that cannot be hired by flagging it down from the street. A black car is typically required to be a relatively new luxury sedan, such as a black Lincoln Town Car, driven by a driver with an excellent driving record. Black cars are considered to offer a low risk profile for insurance purposes. The term black car is intended to encompass its meaning within applicable statutes and regulations in the borough of Manhattan in New York City at the time of filing of the present application, as well as substantially comparable types of for hire vehicles elsewhere and at other times.

Central computer. A computer that serves as the primary repository of certain data. A central computer may be a mainframe, minicomputer, microcomputer (including a personal computer), or other type of computer and is linked to other computing devices by permanent network connections (such as local area networks [hereinafter "LAN's"]) or temporary network connections (such as connections by modems over standard telephone lines). A central computer that is a personal computer may, but need not, be a file or application server.

Computer network. A computer network is a group of computers and associated devices that are connected together by permanent connections, such as cables, or temporary connections, such as telephone links. Examples of computer networks are LAN's, wide area networks [hereinafter "WAN's"], the Internet, including the Web, on-line services, such as America-On-Line, and intranets.

Expiring. An expiring automobile insurance policy is one that will be cancelled in the near future in the absence of remedial action by the insured. An automobile insurance policy typically is considered to be expiring due to the failure of the insured to pay premiums due on the policy, but can also be considered to be expiring for other reasons, such as the passage of time. A policy is considered to be expiring from the date on which it is determined that the policy is expiring through the date on which the policy is cancelled or officially determined no longer to be expiring. Thus, a policy is considered to be expiring in the case of a failure to pay premiums from the date on which the insurance agent or carrier first determines that the premiums have not been timely paid until (and including) the date on which the policy is reinstated, a renewal policy is issued, or an official notation is made in a file or database, as may be appropriate, even though the premiums due may have been paid at an intermediate date.

File. A file is intended to include a paper file and its contents, namely data relating to a particular matter, such as a particular insurance policy or insured, and also similar data stored on a computer in a computer database or other computer file.

For hire passenger vehicle. Any passenger vehicle that is both an automobile and available for hire, including, but not limited to, black cars, gray cars, limousines, silver cars, and taxis.

Insurance agent. An individual or business engaged in selling or marketing insurance to the operators or owners of for hire passenger vehicles. The insurance agent may be, but often is not, also the insurance carrier.

Insurance carrier. A business engaged in insuring for hire passenger vehicles. The insurance carrier may, but often does not, sell policies of insurance directly to the operators or owners of the for hire passenger vehicles. An insurance carrier may, but need not, seek to limit its liability by obtaining reinsurance relating to a portion of the risk that it is assuming under any particular policy.

Remote terminal. Any dumb terminal, computer workstation, or other computing device connected by a network connection to a central computer.

Software interface. A software program that aids a computer user in interacting with computer hardware and with data. In particular, the term software interface is intended to include any program that a user uses to enter, edit, view, or otherwise manipulate data contained in a database. Such a software interface is typically intended both to simplify the process of manipulating such data from the user's point of view and also to restrict the actions that a user may take with respect to such data.

Referring now to FIG. 1, there is shown a block diagram of a first preferred embodiment of a system 100 for generating automobile insurance certificates from a remote computer terminal. This embodiment [hereinafter the "Basic Black Car Embodiment"] relates particularly to automobile insurance certificates relating to policies of insurance on black cars. A remote computer terminal 104 in the form of a personal computer running the Windows 95™ operating system and the Citrix™ middleware program at the insurance agent is connected to printer 108 and is also connected by secure private network 106 to a central computer 124 in the form of a Citrix™ Winframe Enterprise Server at the central office 122 of the insurance carrier. Secure private network 106 may be a value added network, such as that which is accessed through the well known IVANS front end. Stored in the central computer are a policy status database 128 containing data relating to automobile insurance policies and their status vis-á-vis cancellation and a software interface 126 used for accessing and manipulating data stored in database 128.

WAN 140 links central computer 124 and mainframe 136 at central office 122 to LAN 142 at data entry center 138 of the insurance carrier. Mainframe 136 has stored in it certain software applications collectively referred to as main systems 134 (relating to other aspects of the insurance carrier's business, such as underwriting and claims handling) and main database 132 containing data relating to main systems 134. Data are automatically extracted from main database 132 on a weekly basis and fed as a weekly update 130 into policy status database 128 by methods that are well known to those skilled in the database arts.

A remote computer terminal 146 in the form of a personal computer is connected to LAN 142 at data entry center 138. Remote computer terminal 146 is also connected to printer 148. Cancellations 144 of existing automobile insurance policies (typically due to expiration of policies without timely renewal) are generated automatically by the system from database records. These cancellations are then sent to remote computer terminal 146 for viewing or printing. Print orders may be entered at remote computer terminal 146, resulting in the transmission of data 150 sufficient for the printing of insurance policy cancellation notices 112 in the form of New York State FH4 forms at data entry center 138 and the transmission of a cancellation report 110 for printing at the office of the insurance agent 102. Cancellation processing 118, with the aid of software interface 126 and policy status database 128, may also be performed on remote computer terminal 104 and printed on printer 108 at the office of insurance agent 102. Similarly, the processing 116, with the aid of software interface 126 and policy status database 128, related to insurance policy renewals 114 (in the form of New York State FH1 forms), either before or after the preparation of insurance policy cancellation notices 112 may be performed at either remote computer terminal 104 or remote computer terminal 146.

Figure 2:
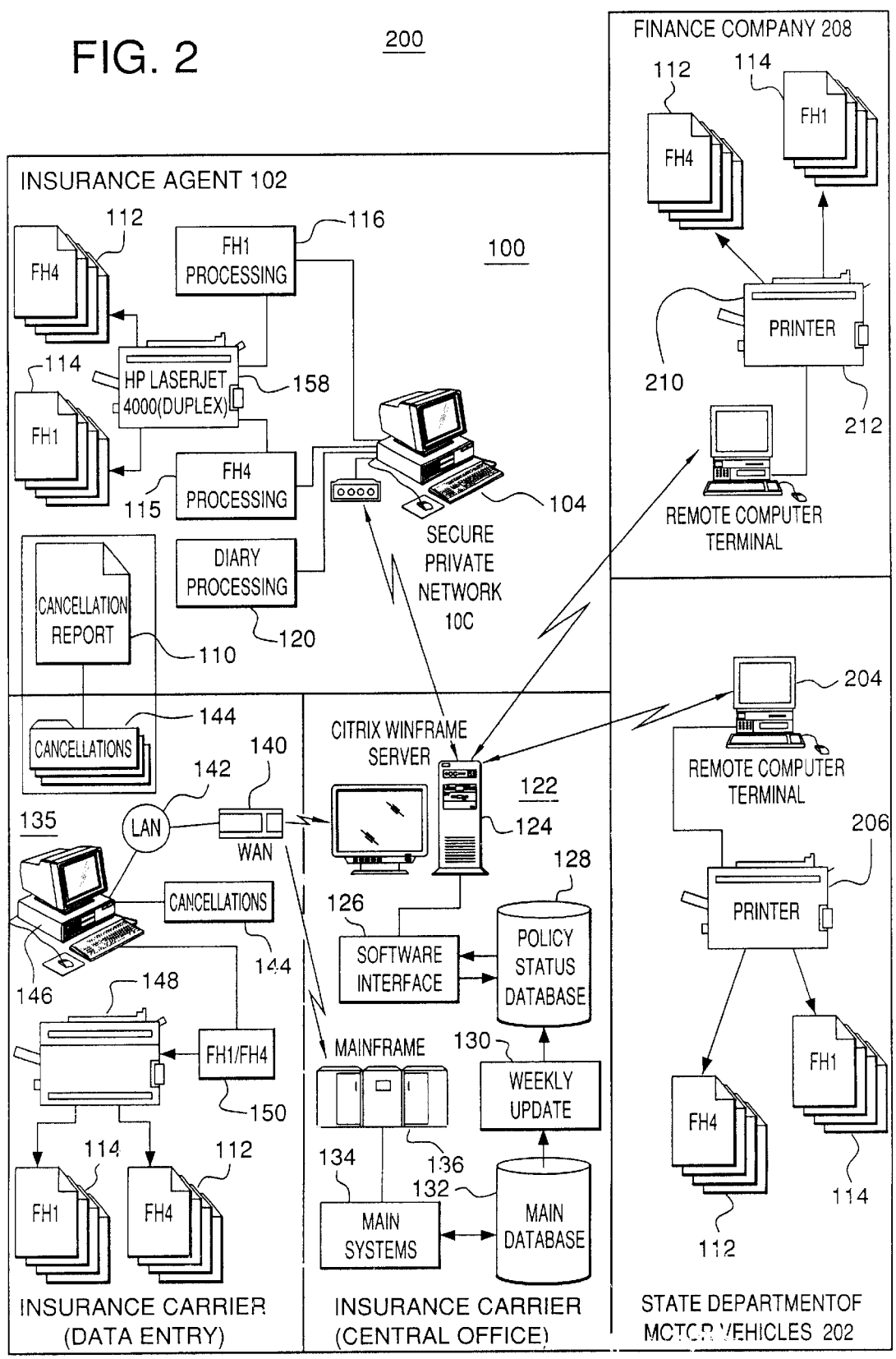
FIG. 2 is a block diagram in accordance with a second preferred embodiment of the present invention.

Referring to FIG. 2, a block diagram of a second preferred embodiment of the present invention [hereinafter the "State and FinCo Black Car Embodiment"] is set forth. The State and FinCo Black Car Embodiment is identical to that of the Basic Black Car Embodiment with certain additions that will be described in the following paragraphs.

A remote computer terminal 204 in the form of a personal computer running the Windows operating system and the Citrix middleware application at a state department of motor vehicles 202 (for the state of the insured vehicles in question) is connected to central computer 124 by a network connection as well as to a local printer 206 at the state department of motor vehicles 202. Cancellation notices 112 and renewal forms 114 may be printed automatically at printer 206 when processed by the system. In addition, a user at the state department of motor vehicles may view on remote computer terminal 204 any currently outstanding cancellation notice and any currently valid renewal form and print on printer 206 any such cancellation notice or renewal form.

A remote computer terminal 210 in the form of a personal computer running the Windows operating system and the Citrix middleware application at a finance company 208 (involved in financing the insurance of the insured vehicles in question) is connected to central computer 124 by a network connection as well as to a local printer 212 at the finance company 208. Cancellation notices 112, and renewal forms 114, relating to policies the finance company is financing may be printed automatically at printer 212 when processed by the system. In addition, a user at finance company may view on remote computer terminal 204 any currently outstanding cancellation notice, and any currently valid renewal form, relating to policies the finance company is financing and print on printer 206 any such cancellation notice or renewal form.

One skilled in the art will recognize, of course, that additional embodiments combining elements relating to either finance company 208 or state department of motor vehicles 202, but not both, with the Basic Black Car Embodiment are possible, as are embodiments relating to insurance of other classes of for hire automobiles.

Figure 3:
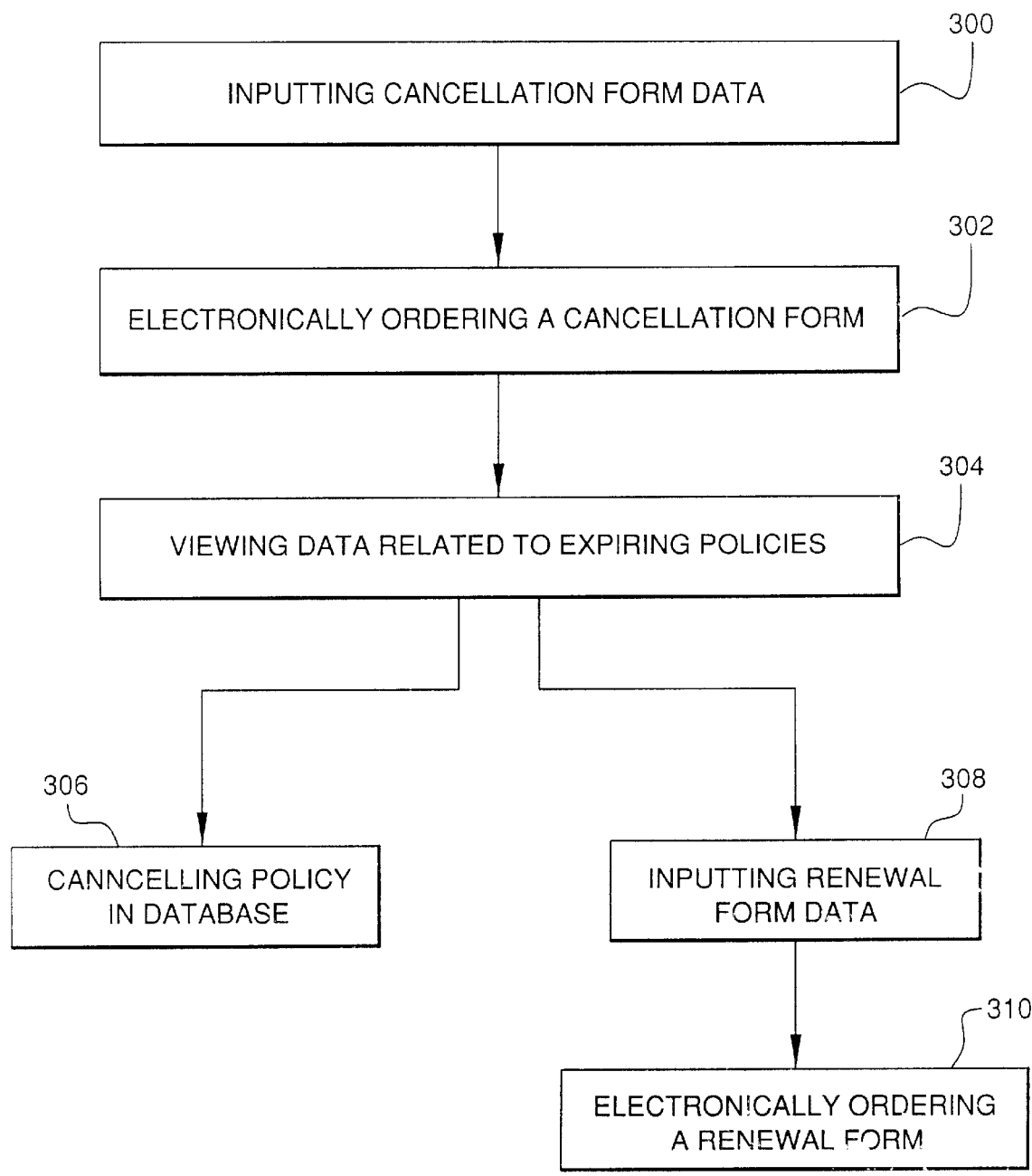
FIG. 3 is a flow diagram showing the operation of a first preferred embodiment of the present invention.

Referring now to FIG. 3, the process begins with the entry of data regarding an expiring policy. In the Black Car Embodiment, an insurance agent typically receives a notice from a finance company stating that an insured has failed to pay premiums due on a policy. The insurance agent then enters data from that notice into policy status database 128 by means of software interface 126 from remote terminal 104 in step 300. In the State and Finco Embodiment, such data is entered into policy status database 128 by means of software interface 126 from remote terminal 210 by an employee of the finance company. The data entered should include at least a date on which the policy will be cancelled if appropriate action is not taken by the insured prior to that date. In the Black Car Embodiment, this date is typically fifty days from the date the notice is received from the finance company and is stored in the "Expiration_Date" field of table 700 described below. The insurance agent then orders a cancellation form electronically in step 302 using screens 500 and 600 as discussed below.

Figure 4:
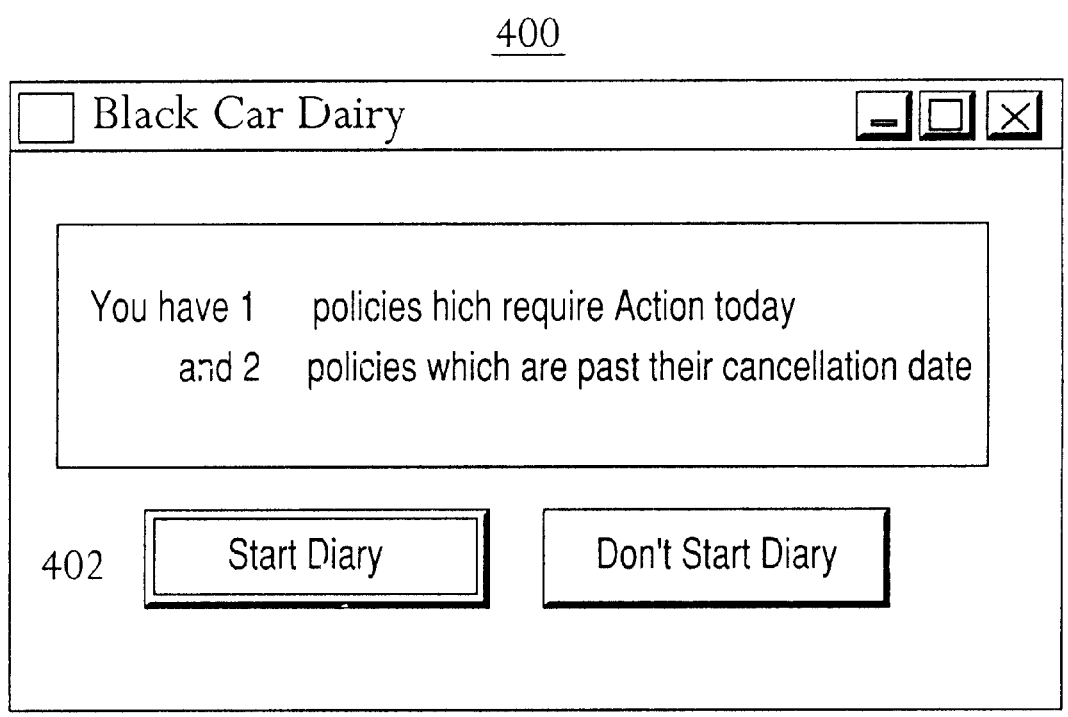
FIG. 4 illustrates a graphical user interface used to aid an insurance agent in identifying expiring automobile insurance policies in accordance with a first preferred embodiment of the present invention.

The insurance agent then need take no further action with respect to the expiring policy until reminded by the system on the date of cancellation, at which time the agent either cancels the policy or issues a renewal form. In step 304, the insurance agent begins by launching software interface 126 from remote terminal 104 on the date of cancellation. Although the application is launched from the remote terminal, it actually runs on central computer 124 and is accessed through a Citrix connection. Security is provided by the operator of secure private network 106, taking advantage of features available in Citrix Winframe Server. FIG. 4 illustrates a startup screen 400 forming a part of software interface 126. Startup screen 400 provides a notification of the existence of expiring policies requiring agent action and also provides a button 402 for accessing a list of such policies.

The list of expiring policies is generated automatically by the system on a periodic basis, preferably daily. Software interface 126 running on central computer 124 compares the cancellation date of each policy of insurance with the current date. The cancellation date of each policy of insurance is stored in table 700, described below, in the "Expiration_Date" field. Therefore, an SQL query selecting one or more fields including the policy number field where the system date equals the Expiration_Date field will retrieve the data records relating to all expiring policies of insurance on which action must be taken. These records are then presented in user-friendly fashion as is set forth below.

The agent retrieves electronically the data in an insured's file with the aid of screens 500 and 600. FIG. 5 illustrates a screen 500, forming a part of software interface 126, that sets forth the results of a search on either a policy number or an insured's name in grid 502. By clicking on any column of a row relating to an expiring policy shown in grid 502, the user may navigate to screen 600, shown in FIG. 6, with data relating to the expiring policy displayed on that screen. Information relating to the policy itself, including the policy number, carrier, expiration date, and cancellation status, is displayed in region 602. Required information relating to the insured, including the insured's name and address, is displayed in region 604, while optional information relating to the insured's identification number is displayed in region 606. Information relating to the insured vehicle is displayed in region 608. The data displayed in any of regions 602 through 608 may be edited by the agent. Region 612 displays transaction information that must be entered by the agent. Radio group 610 in region 612 allows the agent to select FH1 to perform a renewal transaction or FH4 to perform a cancellation transaction.

If the insured has not taken appropriate action to avoid cancellation of the policy, such as paying premiums due, the agent proceeds to cancel the policy in step 306. In some embodiments, no action need be taken and the policy will be cancelled automatically as soon as the cancellation date passes. In other embodiments, the agent might be required to edit a field in database table 700, such as the "Policy_Status" field. In the Black Car Embodiment, the agent must cancel the policy by entering data into a Commercial Automobile Module, which is a part of main database 132. If the insured has taken appropriate action, such as paying all premiums due prior to the cancellation date, the agent proceeds to enter renewal data in step 308. This data will comprise at least a notation that the policy is no longer expiring. Typically, the data would include as well the date on which the policy is being renewed, and, optionally, details regarding any payments of premiums that may have been made.

In step 310 (or in step 302, as discussed above), the agent electronically orders an automobile insurance certificate from a remote terminal. The automobile insurance certificate may be a renewal policy (in step 310) or a cancellation certificate (in step 302). At this point, the insurance carrier may optionally verify compliance with its underwriting standards in the case of a renewal policy. Alternatively, the insurance carrier may conduct such verification either prior to the initial identification of each expiring policy (e.g., by classifying each expiring policy prior to expiration) or subsequent to the ordering of the renewal policy in step 310.

Thereafter, an automobile insurance certificate may be printed by clicking on button 614 on screen 600, which causes a cancellation notice or renewal policy to be printed, depending on the selection in radio group 610.

Figure 7:
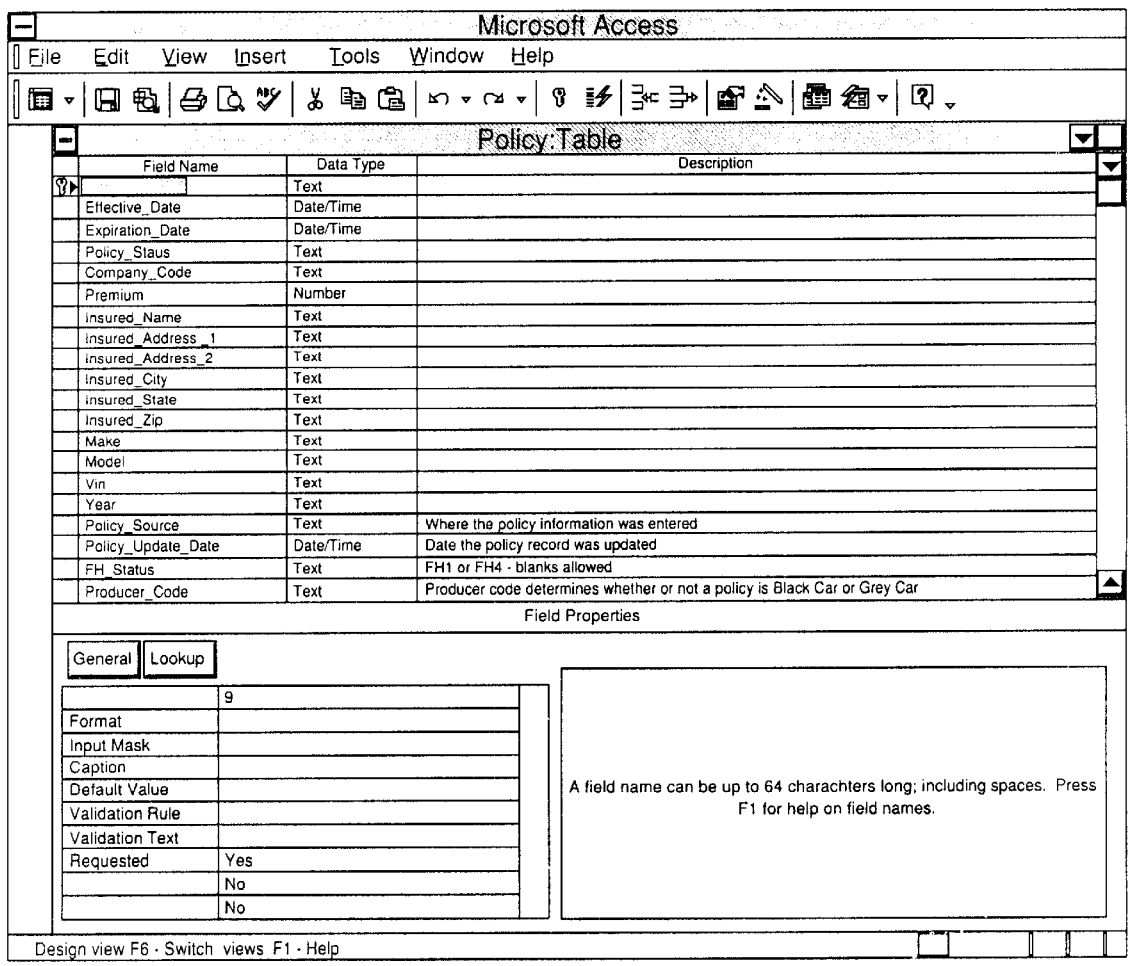
FIG. 7 illustrates the data structure of a record used for storing data relating to an automobile insurance policy in accordance with a first preferred embodiment of the present invention.
Figure 8:
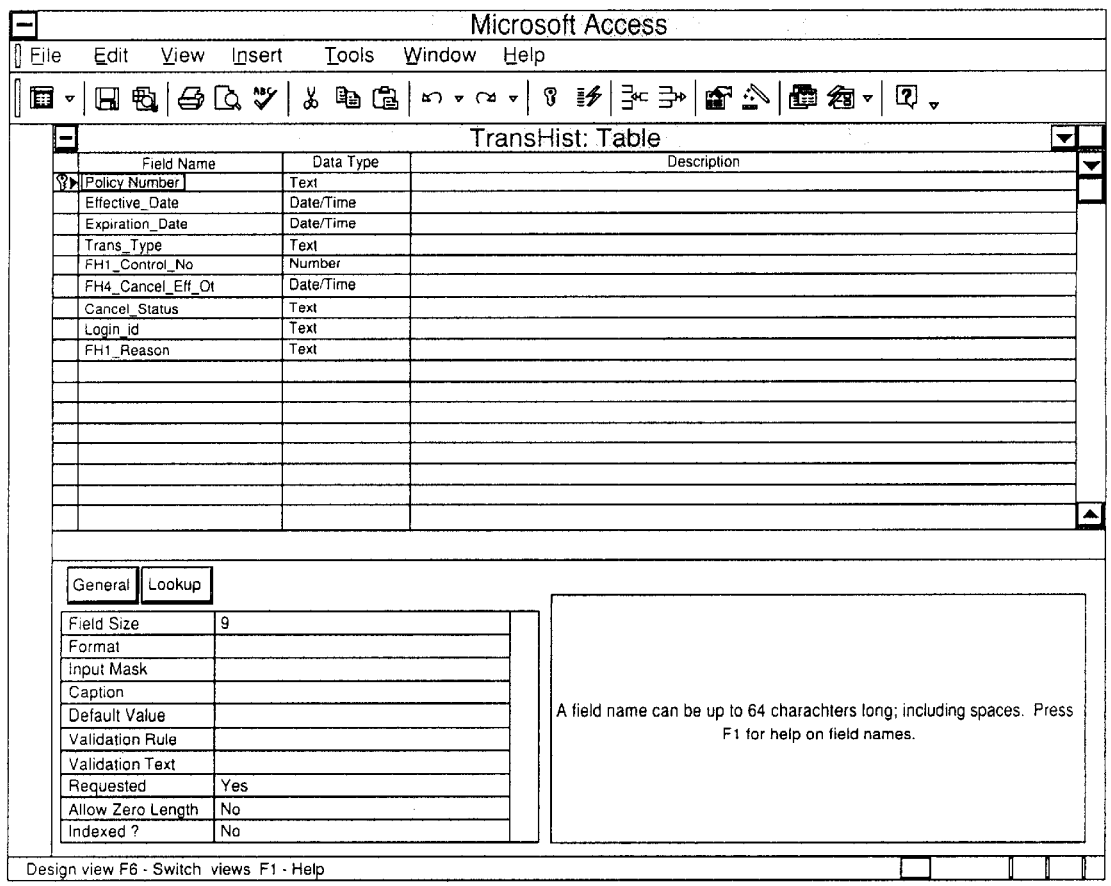
FIG. 8 illustrates the data structure of a record used for storing data relating to the status of an automobile insurance policy in accordance with a first preferred embodiment of the present invention.

Referring to FIGS. 7 and 8, policy status database 128 (see FIG. 1) may be implemented using a commercial off-the-shelf relational database, such as Microsoft Access™. FIG. 7 sets forth some of the fields in a table used in implementing the Basic Black Car Embodiment. The data entered into each text box in screen 600 (see FIG. 6) is stored in a separate field in table 700 that is linked programmatically to the corresponding text boxes in screen 600, as is well known in the database programming arts. The types of the fields are text, number, or date/time as is appropriate based on the underlying data stored in such fields.

FIG. 8 illustrates a table 800 used to store transactions related to policies stored in table 700 (see FIG. 7). Table 800 is related to table 700 in a many-to-one relationship, with policy number field 802 being the foreign key in table 800. The types of transactions stored in table 800 in a transaction type field include cancellations and renewals. Transaction and effective dates are also stored, as are control numbers, cancellation status, the identity of the agent performing a transaction, and the reason for entering any renewal. The data are stored in text, number, or date/time fields, as is appropriate.

Figure 9:
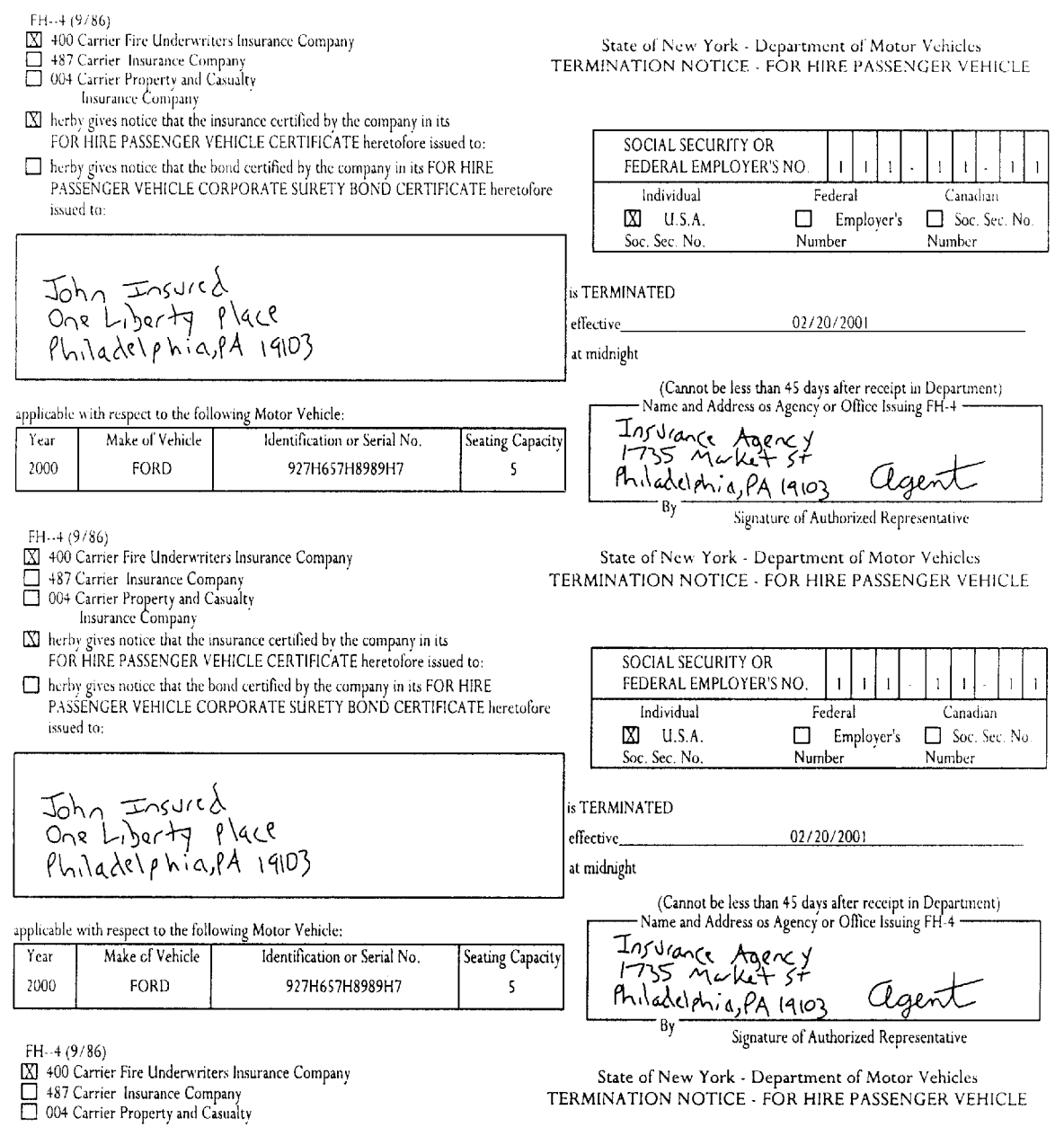

FIG. 9 illustrates a sample cancellation notice in the Basic Black Car Embodiment prepared in accordance with New York State law and regulations at the time of filing of the present application. FIG. 10 similarly illustrates a sample renewal policy in the Basic Black Car Embodiment prepared in accordance with New York State law and regulations at the time of filing of the present application.

The present invention may be embodied in other specific forms without departing from the spirit or essential attributes of the invention. Accordingly, reference should be made to the appended claims, rather than the foregoing specification, as indicating the scope of the invention.

What is claimed is:

1. A method of generating at least one of a cancellation certificate, a renewal certificate, and a proof of insurance for an automobile, from at least one remote computer terminal connected by a computer network to a central computer, comprising the steps of:

automatically flagging at least one expiring policy stored on the central computer;

generating a list of expiring policies according to said automatically flagging step;

notifying a local user of at least one expiring policy from the list of the expiring policies requiring user action by the local user;

receiving at least one user action instruction from the local user, wherein the at least one user action instruction is in accordance with an examining by the local user of the at least one of the expiring policies; and electronically ordering and printing the at least one of the cancellation certificate, the renewal certificate, and the proof of insurance at the local user in accordance with said receiving step.

2. The method of claim 1, wherein the proof of insurance is a standardized proof of insurance certificate in accordance with an FH1 form.

3. The method of claim 1, wherein the cancellation certificate is a standardized termination certificate in accordance with an FH1 form.

4. A method in accordance with any of claims 1, 2, or 3, wherein the automobile insurance policy relates to a black car.

5. A system for generating at least one of a cancellation certificate, a renewal certificate, and a proof of insurance for an automobile, from at least one remote computer terminal connected by a computer network to a central computer, comprising:

automated means for flagging at least one expiring policy stored on a central computer;

means for generating a list of the expiring policies in accordance with the at least one expiring policy from said automated means for flagging; and means for electronically ordering and locally printing the at least one of the cancellation certificate, the renewal certificate, and the proof of insurance in response to a user action responsive to said means for generating.

* * * * *